United States Patent

Satori et al.

[11] Patent Number: 6,131,894
[45] Date of Patent: Oct. 17, 2000

[54] LIQUID SEALED TYPE RUBBER MOUNT DEVICE

[75] Inventors: Kazutoshi Satori; Osamu Ninakawa, both of Saitama, Japan

[73] Assignee: Yamashita Rubber Kabushiki Kaisha, Saitama, Japan

[21] Appl. No.: 09/131,839

[22] Filed: Aug. 10, 1998

[51] Int. Cl.[7] .................................................. F16F 13/00
[52] U.S. Cl. ..................................... 267/140.13; 267/219
[58] Field of Search ........................ 267/140.11, 140.13, 267/219; 248/562, 636

[56] References Cited

U.S. PATENT DOCUMENTS

| | | | |
|---|---|---|---|
| 4,826,126 | 5/1989 | Katayama et al. | 248/562 |
| 4,889,325 | 12/1989 | Flower et al. | 267/219 |
| 4,997,168 | 3/1991 | Kato | 267/140.13 |
| 5,104,100 | 4/1992 | Simuttis | 267/140.13 |
| 5,433,421 | 7/1995 | Ishiyama | 267/140.13 |
| 5,501,433 | 3/1996 | Satori | 267/140.13 |
| 5,667,205 | 9/1997 | Mutoh et al. | 267/140.13 |
| 5,772,189 | 6/1998 | Satori et al. | 267/140.13 |

FOREIGN PATENT DOCUMENTS

| | | |
|---|---|---|
| 0271894 | 6/1988 | European Pat. Off. . |
| 0534124 | 3/1993 | European Pat. Off. . |
| 8623498 | 5/1988 | Germany . |
| 4036517 | 6/1998 | Germany . |
| B2-62-23178 | 5/1987 | Japan . |
| 2055172A | 2/1981 | United Kingdom . |

OTHER PUBLICATIONS

Patent Abstracts of Japan, JP 30 104824 A, vol. 009, No. 256, Honda Giken Kogyo Kabushiki Kaisha, (Jun. 10, 1985).

Primary Examiner—Robert J. Oberleitner
Assistant Examiner—Mariano Sy
Attorney, Agent, or Firm—Birch, Stewart, Kolasch & Birch, LLP

[57] ABSTRACT

A liquid chamber is arranged with a first support member (1), a second support member (2) and an elastic member (3), an inside of the liquid chamber is divided to a main liquid chamber (11) and an auxiliary liquid chamber (12) by a partition member (10) and both chambers are communicated with an orifice passage (14). On an inner face of a conical portion (4) of the elastic member (3), thin wall portions (7) are provided by forming recess portions (6) at axis symmetrical positions so as to yield a minimum value for a dynamic spring characteristic against a vibration input in a designated medium frequency by a membrane resonance and a medium to high frequency device (17) projecting into the main liquid chamber (11) is provided to the first support member (1) so as to yield a minimum value for the dynamic spring characteristic against a vibration input in a designated high frequency. Furthermore, it is possible that the thin wall portion (7) is adapted to be asymmetric, the medium to high frequency device (17) is arranged to be non-circular, an elastically deforming wall is used for the fixed partition wall and the elastic control mechanism is provided to switch a plurality of the orifice passages at any time.

10 Claims, 16 Drawing Sheets

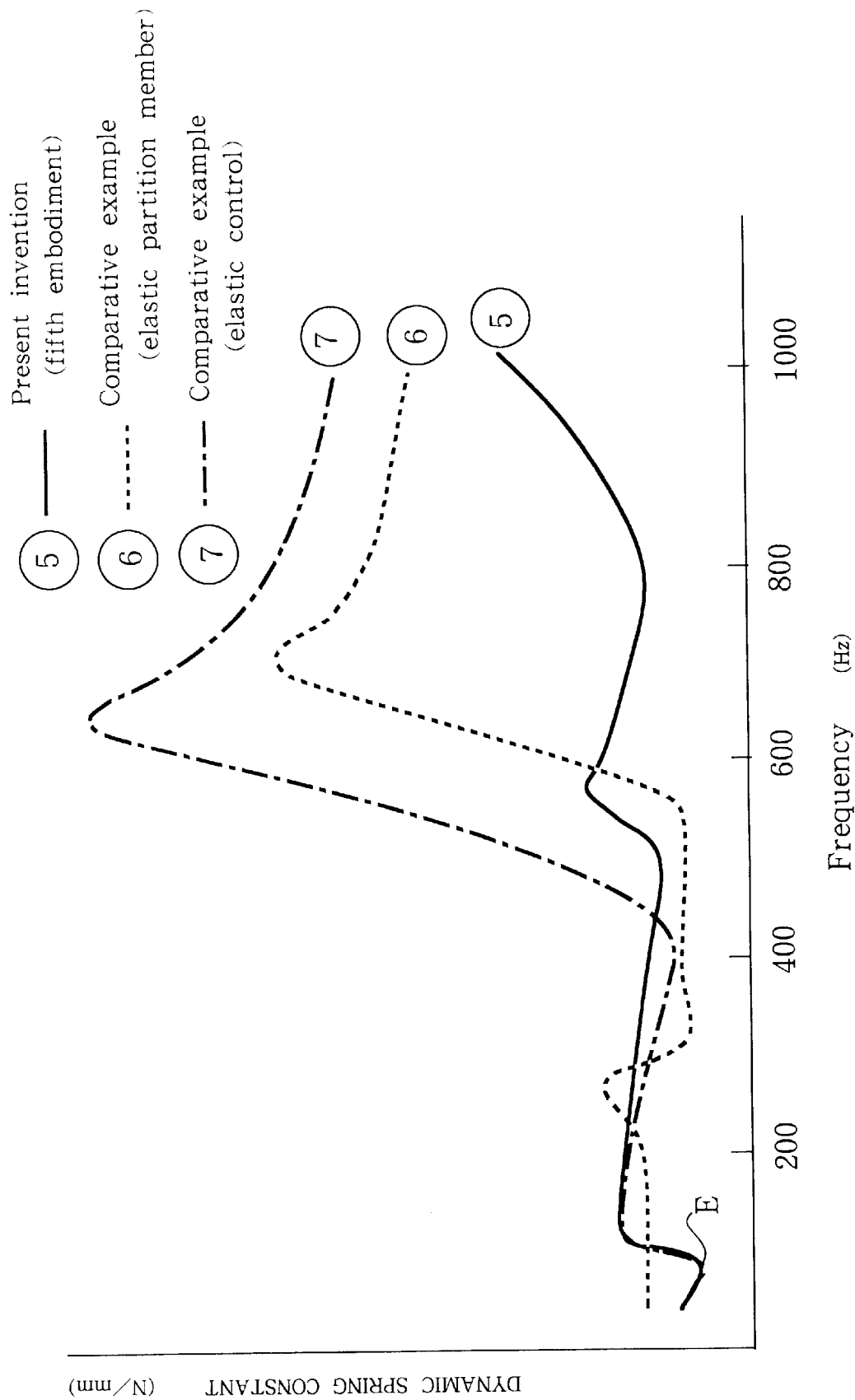

LIQUID SEALED TYPE RUBBER MOUNT DEVICE

BACKGROUND OF THE INVENTION

1. Field of the Invention

This invention relates to a liquid sealed type rubber mount device such as an engine mount rubber for an automobile vehicle.

2. Description of the Prior Art

Such a liquid sealed type rubber mount device is disclosed for example in Japanese Patent Publication (Kokoku) No. Sho62-23178, in which a first support member is attached to a vibration source, a cylindrical shaped second support member is attached to a vehicle body, a conical shaped rubber body is interposed between the two support members, and a liquid chamber is formed within tie rubber body to admit buffering liquid therein, wherein a thin wall portion is partially provided on the rubber body, a disk shaped member is provided projecting from the first support member into the second support member, a partition member is arranged to divide the second support member into two chambers, while an annular passage is formed between an outer peripheral portion thereof and an inner wall of the second support member and a diaphragm is provided on a bottom portion of the second support member.

According to an above stated construction, since it is aimed to damp a vibration by a flow resistance, the device can deal with the vibration of some 10 Hz and to the contrary, it has a high dynamic spring characteristic in a frequency range for example 100 to 500 Hz and a high frequency range for example 500 to 1000 Hz.

On the other hand, it is known that the rubber wall of the liquid chamber is not provided with such a thin portion and is instead formed with a uniform thickness with respect to to a circumferential direction, and a disk shaped member, which is connected to a vibration input side projecting into the liquid chamber, whereby the low dynamic spring characteristic is realized. A curve shown as a conventional example in FIG. 3 describes a change of the dynamic spring characteristics vs. the frequency in such a construction. In such a liquid sealed type mount device, the disk shaped member acts as a medium frequency device and a minimum value a is generated by a liquid column resonance at a specified frequency in the medium frequency range accompanying a flow of liquid in a gap between the peripheral rubber wall and the disk shaped member.

However, even if the dynamic spring constant becomes low in the medium frequency range, as observed as a peak b by a reaction of the low dynamic spring constant in a little higher frequency, which result in showing the high dynamic spring constant in the high frequency range. Meanwhile, in recent years on the precondition of the low dynamic spring constant in a low frequency range, it is required that the dynamic spring characteristic is made lower not only in the medium frequency range but also in the high frequency range and the low dynamic spring characteristic is realized in a wide frequency range.

SUMMARY OF THE INVENTION

In order to solve the problems described above, according to the first invention of the present invention, there is provided a liquid sealed type rubber mount device comprising a first support member attached to a vibration source, a second support member attached to a vehicle body, an elastic member formed in a substantially conical shape interposed between the first and second support members, the first and second support members being adapted to form a liquid chamber therebetween with at least a part of a wall thereof, a partition wall dividing the liquid chamber into a main chamber and an auxiliary chamber, and an orifice passage formed within the partition wall for usually communicating the two liquid chambers, wherein a part of the wall composing said auxiliary liquid chamber is formed of a diaphragm, a medium to high frequency device is provided, which is attached to the first support member projecting into the main liquid chamber so as to absorb a vibration component in the medium to high frequency by forming a flow space between the inner wall of the conical portion of the elastic member and therewith, and a thin wall portion is formed on a part of a conical portion of the elastic member and in a vicinity of the medium to high frequency device so as to yield a minimum value for the dynamic spring characteristic by generating a membrane resonance via vibration input in the medium to high frequency range.

Hereupon, the membrane resonance means a resonance phenomenon generated when the thin wall portion of the elastic member deforms resiliently with spring property by a liquid flow within the liquid chamber. And the medium frequency range in the present invention means especially 100 to 500 Hz region among the ordinary medium frequency range of 40 to 500 Hz.

In that place, thin wall portion may be provided at plural positions and each thin wall portion can be arranged on a symmetric position in a same shape.

Also, said thin wall portions may be provided at plural positions and each thin wall portion can also be arranged on symmetrical positions in different shapes.

The second invention includes a liquid sealed type rubber mount device of the first invention, wherein said medium to high frequency device may be formed in a non-circular shape cut out a portion adjacent to the thin wall portion among the peripheral portion thereof viewed from a principal input direction of the vibration and a gap between the cut out portion and the thin wall portion is made to be larger than that in other portions.

The third invention includes a liquid sealed rubber mount device of the first invention, wherein said partition wall may be arranged as an elastic partition wall changing the dynamic spring characteristic thereof according to an inner pressure change in the liquid chamber.

The fourth invention includes a liquid sealed mount rubber device of the first invention, wherein instead of said partition wall, an elasticity control mechanism is provided to arrange a plurality of orifice passages having different properties to switch at the designated frequencies.

The fifth invention includes a liquid sealed rubber mount device of the first invention, further comprises an open and close portion to switch the orifice passages formed on a part of a diaphragm composing an auxiliary chamber, a driving portion to open and close the open and close portion, wherein a metal-made cylindrical covering member is provided to cover a periphery of the elastic member, on an opening side of an end thereof two kind of claws as a first and a second claw are formed in a different height and a first caulking portion fixing the partition wall and the diaphragm via a caulking with the first claw and a second caulking portion fixing a driving portion via a caulking with the second claw are provided.

The sixth invention includes a liquid sealed rubber mount device of the fifth invention, the driving portion comprises a top portion abutting against the open and close portion, a cylindrical membrane member integrated an end thereof with an outer peripheral portion of the top portion to allow the movement of this top portion, a fixing ring integrated another end of the membrane portion therewith and a cup-like member being fitted with the fixing ring, wherein to the cylindrical covering member a positioning ring is provided to fix an end side thereof by a first caulking portion, and an tip portion of this positioning ring is abutted against a part of a ring portion elastic member covering the fixing ring after inserted into the cup-like member and an opening edge portion of the cup-like member is fixed by a second caulking portion in a state that a gap is made between an opening edge portion of the cup-like member and the first caulking portion.

The seventh invention includes a liquid sealed rubber mount device of said sixth invention, wherein the fixing ring possesses a small diameter portion and a large diameter portion, a gap is made between an outer peripheral face of the large diameter portion and an inner peripheral face of the cup-like member, on an outer peripheral portion of the small diameter portion an outer periphery covering portion, which is formed by a part of the ring portion elastic member and contacted on an inner peripheral face of the cup-like member, is provided and further comprises a first seal lip projecting from the outer periphery covering portion and pressed against an inner peripheral face of the cup-like member and a second seal lip projecting from the ring portion elastic member close to an end portion of the fixing ring and pressed against on a bottom portion of the cup-like member.

The eighth invention includes a liquid sealed rubber mount device of said seventh invention, wherein on a part of the positioning ring a small diameter portion is provided to form an entire circumferential gap between the inner peripheral face of the cup-like member thereof and through the gap an atmosphere opening hole provided in the cup-like member and a space between the diaphragm and the driving portion are communicated.

According to the first invention, as shown in a characteristic curve ① of FIG. 3, in response to the vibration input of the medium to high frequency region, at first, in a medium frequency range the thin wall portion of the elastic member generates a membrane resonance to yield a minimum value A for the dynamic spring characteristic. The medium to high frequency device yields a minimum value B for the dynamic characteristic in the high frequency range by the liquid column resonance accompanying with the liquid flow in a gap between the medium to high frequency device and the thin wall portion.

Therefore, the dynamic spring characteristic can be lowered in either range of the medium and high frequency hence the low dynamic spring constant is realized in a wide range spreading over the medium to high frequency.

In this time, when a plurality of the thin wall portions are provided and arranged with the same shape at symmetric positions, as shown by the characteristic curve ①, a single minimum value A can be yielded.

When a plurality of the thin wall portions are provided and arranged in respectively different shapes at symmetric positions, as shown by the characteristic curve ② a plurality of the minimum values by the membrane resonance can be yielded as C and D.

According to the second invention, when the medium to high frequency device is formed in a non-circular shape viewed from a principal input direction of the vibration and a gap between the thin wall portion and the medium to high frequency device is made to be larger than that in other portions, resonance frequency of the liquid column resonance by the medium to high frequency device becomes high and the minimum value B widen a space between the minimum value A and itself as shown in characteristic curve ③ of FIG. 7. As a consequence, because a peak value P2 of the dynamic spring constant between both minimum values A and B is reduced lower than the peak value P1 of the characteristic curve ①, the dynamic spring constant can be as much low over the entire frequency range.

According to the third invention, by constructing the partition wall with an elastic partition wall changing the dynamic spring characteristic according to the change of an inner pressure in a liquid chamber, addition to absorption of the inner pressure via an elastic deformation of the elastic partition wall, the elastic partition wall itself is made to change the dynamic spring characteristic to the frequency and to membrane-resonate in natural resonance frequency. When this construction is combined with the construction having the thin wall portion of the elastic member and the medium to high frequency device in the first invention, since the membrane resonance between the elastic partition wall and the thin wall portion and the liquid column resonance generated by the medium to high frequency device are complicated, as shown by the characteristic curve ④ in FIG. 7, each minimum values and peaks are made even and lowering of the dynamic spring are still more remarkably achieved over the whole frequency.

According to the fourth invention, because instead of the partition wall, a plurality of the orifice passages having different properties are arranged to change at designated frequencies, an equal dynamic spring constant can be actualized at optional designated frequencies such as idling region in addition to making low dynamic spring constant over the almost entire frequency range from the low frequency range to the high frequency range.

According to the fifth invention, because the auxiliary chamber side in which the liquid is sealed and the driving portion which actuates the open and close valve are separated and they are arranged to be fixed independently in a different process, it is surely prevented that the sealed liquid invades into the driving portion side and reaches to the pivotal driving portion hence the quality of the products can be improved and at the same time the assembly process can be an easy one.

Moreover, if the driving portion is eliminated and the partition wall side is changed to a general partition wall formed with a single orifice passage or said elastic partition wall construction, because the liquid sealed rubber mount construction according to said first to third invention can be obtained, the parts are used in common for various purpose.

Further, because the liquid sealed portion of the diaphragm side and the driving portion are individually secured by the first and second caulking portions made of two kind of claw as the first and second claws provided to the cylindrical covering member, a number of the parts can be decreased and a fixing construction and an assembling process of the device can be simplified.

In the sixth invention, because an end side of the positioning ring, another end side thereof is fixed to the cylindrical covering member, is abutted against a part of the ring portion elastic member covering the fixing ring to fix the driving portion by the first caulking portion, a gap is made between the opening edge portion of the cup-like member and the first caulking portion and the opening edge portion is fixed by the second caulking portion, the dimensional tolerance in a height direction can be absorbed. Besides, the positioning ring can decide the attaching position of the driving portion to the auxiliary chamber. Therefore, the dimension management and the assembly process becomes easier and working costs can be reduced.

In the seventh invention, since there is a gap between the large diameter portion of the fixing ring and the inner peripheral face of the cup-like member, an investment for a press facilities can be reduced owing to decreasing of the pressing load and the dimensional tolerance in a radial direction can be absorbed. Hence the dimension management and the assembly process becomes easier and the working costs can be reduced.

Furthermore, because the outer periphery covering portion which is formed by a part of the ring portion elastic member, is provided on the outer periphery of the small diameter portion of the fixing ring and is contacted on the inner peripheral face of the cup-like member, the first seal lip which is pressed against between the outer periphery covering portion and the inner peripheral face of the cup-like member and the second seal lip which is pressed against between the ring portion elastic member close to an end portion of the fixing ring and the bottom portion of the cup-like member are equipped, which resulting in a double seal construction, air-tightness in the driving portion can be increased and the precision of the operation can be improved.

In the eighth invention, because the air in an inner space surrounded by the diaphragm and the driving portion can be released from the atmosphere opening hole equipped on the cup-like member to the atmosphere through the through hole of the small diameter portion made on a part of the positioning ring and a circumferential gap between the small diameter portion and the inner face of the cup-like member, a movement of the diaphragm can be adapted to be smooth and which brings a resonance effect of the orifice into full play. Further, even if thermal expansion or contraction of the air occurs, because atmospheric pressure is reserved, an effect for the characteristics by the thermal change can be reduced and stabilized.

Furthermore, even if the positioning ring is placed at any position to the cup-like metal in a circumferential direction, which can communicate to the atmosphere opening hole through the gap. Therefore, the relative position of the positioning ring can be freely arranged to the cup-like metal in the circumferential direction, the assembling performance can be improved.

BRIEF DESCRIPTION OF THE DRAWINGS

The above and other objects, features and advantages of the invention will become more apparent from the following description taken in conjunction with the accompanying drawings, in which:

FIG. 16 a graph showing the dynamic spring characteristic according to the fifth embodiment.

DETAILED DESCRIPTION OF THE PREFERRED EMBODIMENT

Figure 1:
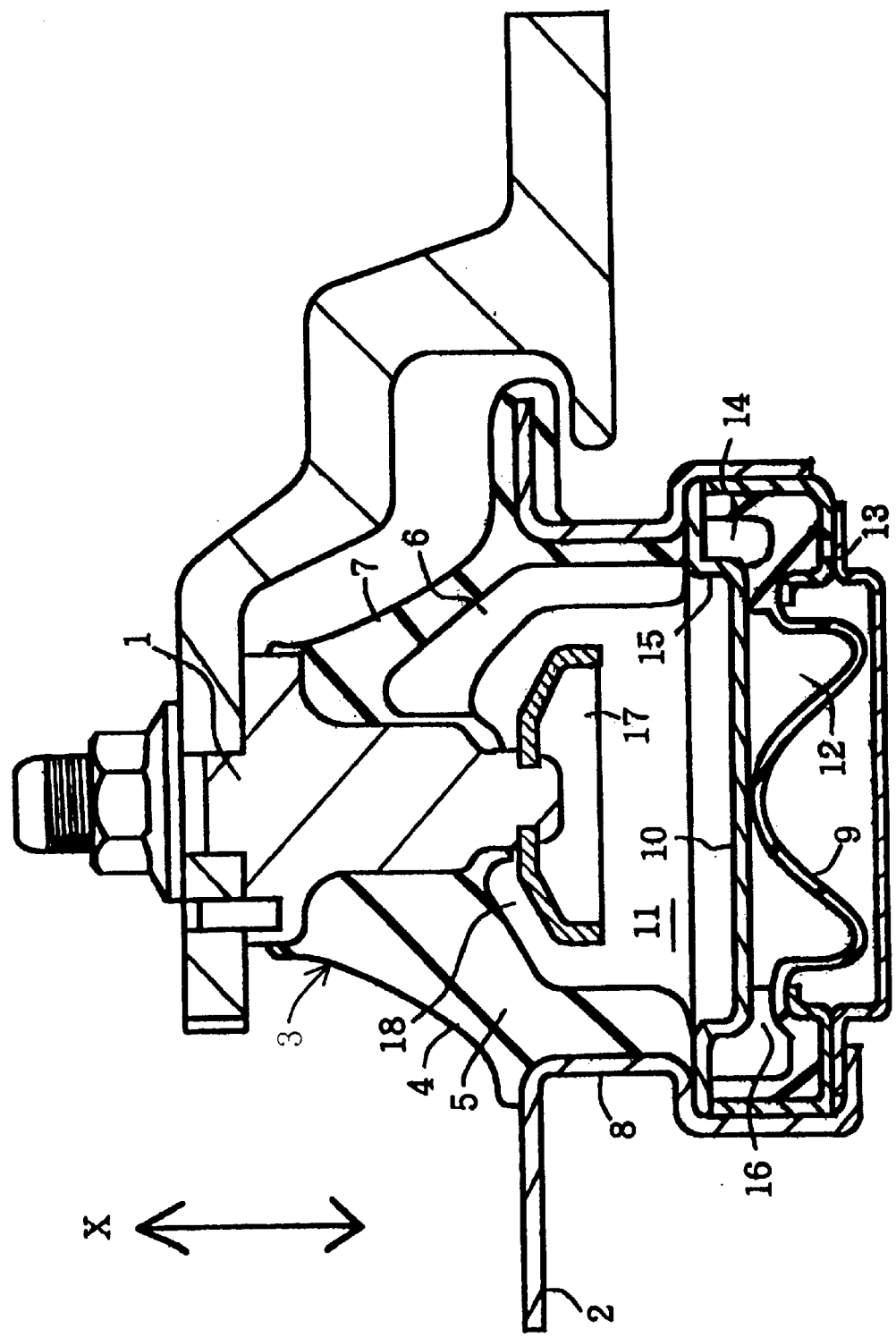
FIG. 1 is a general sectional view of an engine mount according to the first and second embodiments.
Figure 2:
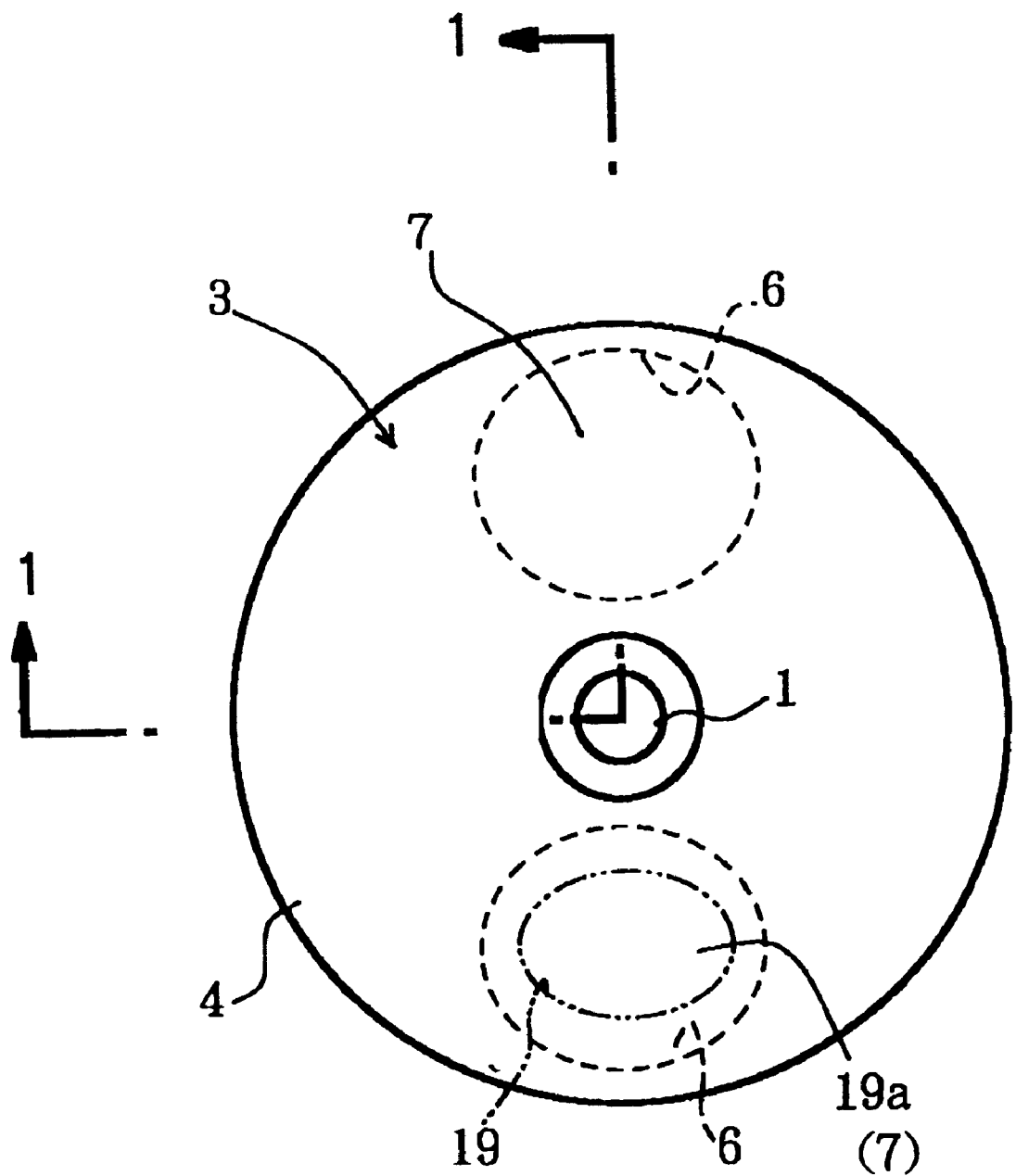
FIG. 2 is a rough plan view of an elastic member.
Figure 3:
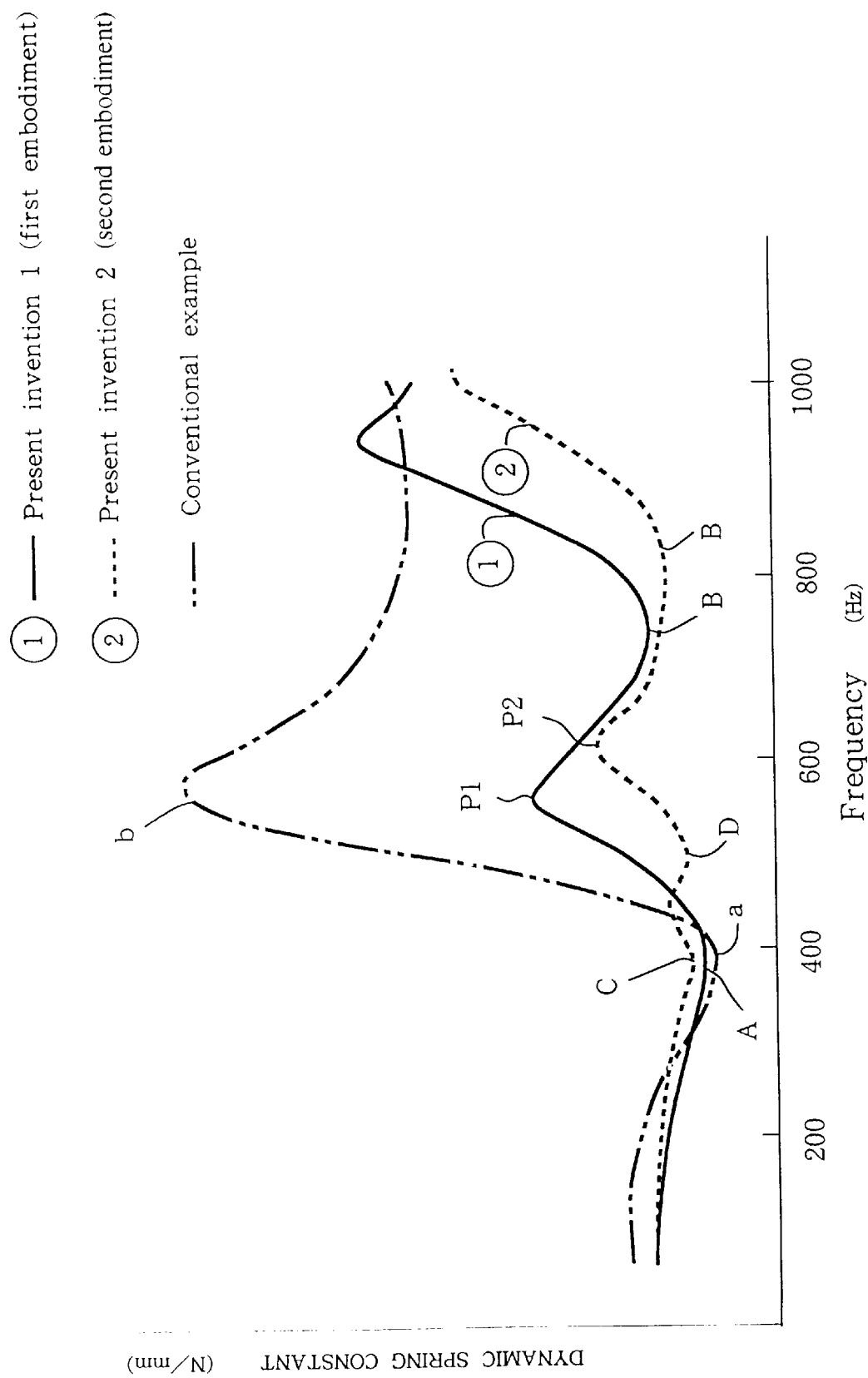
FIG. 3 is a graph showing a dynamic spring characteristic thereof.

FIG. 1 is a general sectional view of an engine mount according to the first embodiment of the present invention (sectional view along line 1—1 direction of the FIG. 2), FIG. 2 is a rough plan view of an elastic member and FIG. 3 is a graph showing a dynamic spring characteristic, wherein the axis of abscissa shows frequency and the axis of ordinates shows a dynamic spring constant.

In the FIG. 1, the engine mount comprises a first support member 1 attached to an engine side as a vibration source, a second support member 2 attached to a vehicle body and a resilient member 3 interposed between the first support member 1 and the second support member 2.

The first support member 1 is made to be in a shaft shape extending into the second support member 2 in parallel to an input direction X of a principal vibration. The resilient member 3 is formed from a suitable elastic material such as rubber or elastomer and formed integrally with a conical portion 4 formed in a generally conical shape and a cylindrical portion 5.

On an inner wall of the conical portion 4, a pair of recesses 6 are formed in the same shape at an axis-symmetrical position and the conical portion 4 of the recess 6 is arranged to be a thin wall portion 7. The recess 6 is formed continuing until inside of the cylindrical portion 5.

The cylindrical portion 5 is integrated to an inside face of a cylindrical covering portion 8 of the second support member 2 and forms a liquid chamber inside thereof with a diaphragm 9 fixed to the inside of the cylindrical portion 8 and the resilient member 3.

This liquid chamber is divided to a main liquid chamber 11 of the first support member side and an auxiliary liquid chamber 12 of the diaphragm 9 side by a partition member 10 provided on an inner side than the diaphragm 9 and the two liquid chambers are communicated by an orifice passage 14 formed between the partition member 10 and a rim portion 13 of the diaphragm 9.

The orifice passage 14 is communicated with the main liquid chamber 11 at an inlet 15 formed in the partition member 10 and communicated with the auxiliary liquid chamber 12 at an outlet 16 formed on the resilient member 3.

The first support member 1 is extended along a center line of the resilient member 3 and an end thereof is projected into the main liquid chamber 11, thereon a generally cup shaped medium to high frequency device 17 is fixed by caulking. The medium to high frequency device 17 is formed in a circular shape viewed from an axial direction of the first support member 1.

Between the medium to high frequency device 17 and an inner face of the conical portion 4, a designated orifice gap 18 is formed and is adapted to absorb the vibration input of the high frequency range by the liquid column resonance.

The thin wall portion 7 is adapted to absorb the vibration input of the designated medium to high frequency range by the membrane resonance owing to changing thickness and area of the membrane through controlling the size and depth of the recess 6.

Next, an operation of the present embodiment is described. As shown in FIG. 3 as the characteristic curve ①, when a vibration of the medium to high frequency range is inputted, the thin wall portion 7 generates the membrane resonance and the dynamic spring constant yields the minimum value A at beforehand set designated frequency.

Furthermore, when a vibration of the high frequency range is inputted, the dynamic spring constant yields a minimum value B at another designated frequency f2 by the liquid column resonance in the orifice gap 18 between the thin wall portion 7 and the inner face of the conical portion 4.

As a result of this, two minimum values A and B are formed in the medium to high frequency range, against the conventional example (a phantom line in FIG. 3) lacking such a consideration, the low dynamic spring constant is turned into reality owing to the lowing the dynamic spring characteristic. Between both the minimum values A and B, a peak P1 of the dynamic spring resonance is formed by a reaction of the membrane resonance A.

The characteristic curve ② in FIG. 3 is relating to the second embodiment which is an example that is provided as shown by a broken line in only one side of the thin wall portion 7 in FIG. 2 where the thin wall emphasis portion 19a is provided to make the thickness thereof thinner by forming the deep recess 19, and the thin wall portion 7 by the recess 6 and the thin wall emphasis portion 19a by the deep recess 19 are arranged to be the symmetrical thin wall portion different in shape. When the resilient member 3 is formed as this, because the membrane resonance frequencies in the thin wall portion 7 and the thin wall emphasis portion 19a are mutually different, two minimum values C and D occur in the medium to high frequency range which result in that the lower dynamic spring constant can be realized.

Figure 4:
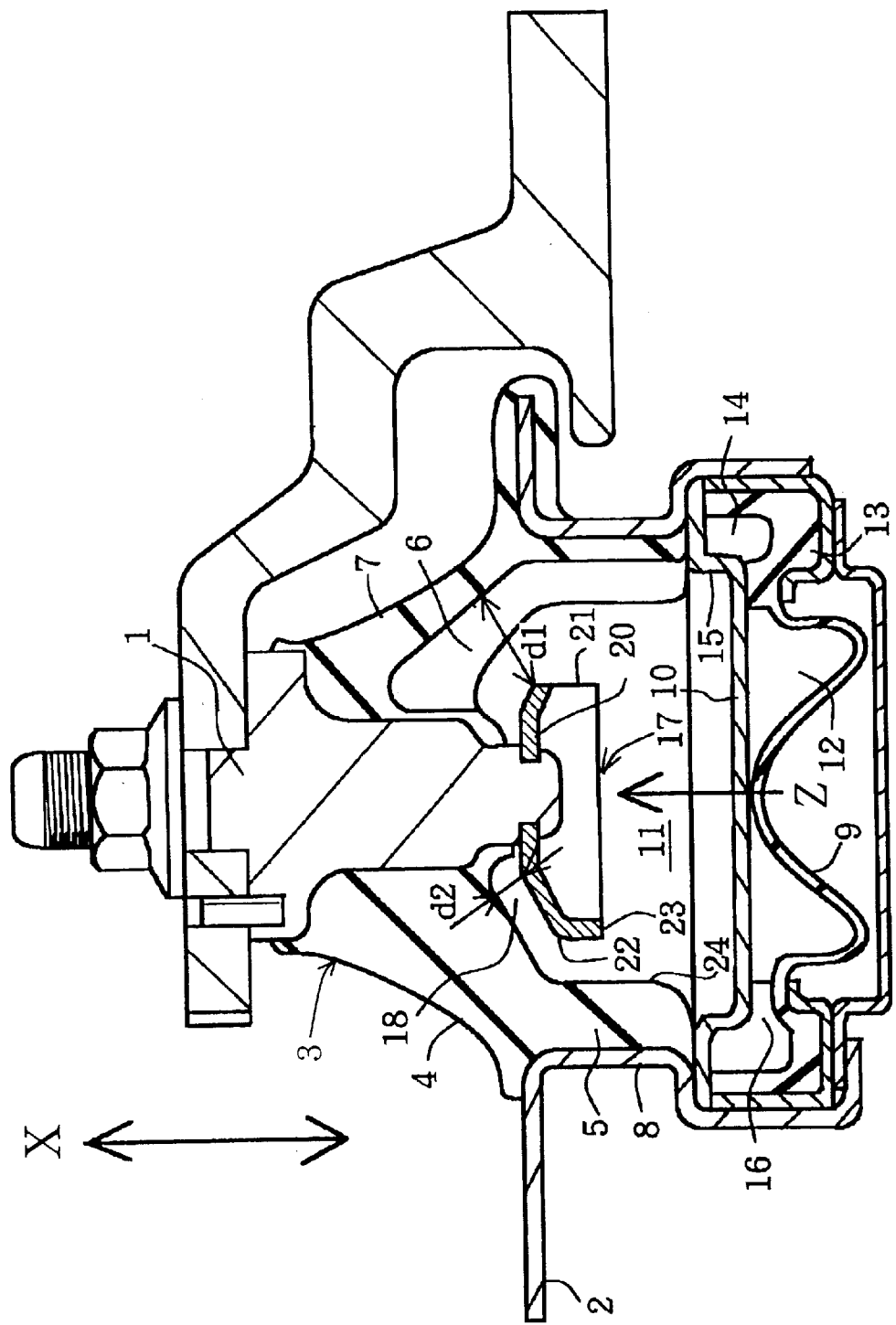
FIG. 4 is a view equivalent to FIG. 1 according to the third embodiment.
Figure 5:
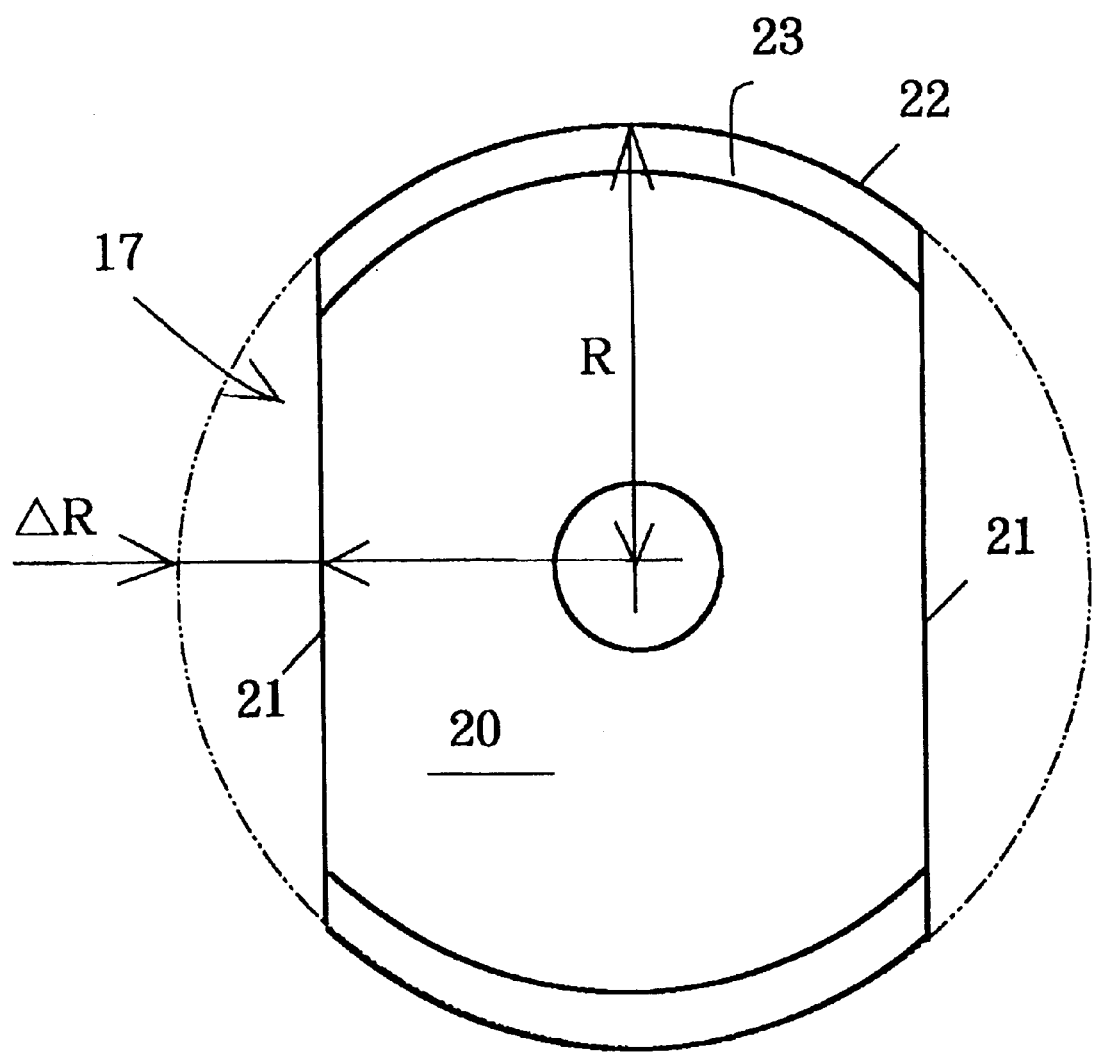
FIG. 5 is a view shown from an arrow Z of FIG. 4 for a medium to high frequency device thereof.

FIGS. 4 and 5 are views showing the third embodiment, FIG. 4 is a view equivalent to FIG. 1 of the former embodiment and FIG. 5 is a view showing the medium to high frequency device from Z arrow direction thereof. Here, since this embodiment is one merely changed a part of the former embodiment, common numerals are used for common portions an explanation of similar repetition is omitted as much as possible and for the explanation portion omitted, an explanation relating to the equivalent portion of the former embodiment is quoted (same for the embodiment hereinafter). Although the specific structural details of each embodiment of the present invention may vary between embodiments, each of the succeeding embodiments incorporates the use of a medium to high frequency device 17 and at least one thin walled portion 7 formed by a respective recess 6.

The medium to high frequency device 17 relating to the third embodiment is formed in a non-circular shape and the designated orifice gap 18 is formed between the inside face of the conical portion of the resilient member 3 and therewith so as to absorb the vibration input in the high frequency range by the liquid column resonance.

When the resilient member 3 is viewed from the upper direction of FIG. 4, the recesses 6 relating to the present embodiment are symmetrically formed thereon at the different place by 180 degrees as similar as shown in FIG. 2. The thin wall portion 7 is adapted to absorb the vibration input of the specified medium frequency range by the membrane resonance through changing the thickness and area of the membrane owing to the controlling the dimension and depth of the recess 6.

Besides, if constructions of two recesses 6 arranged on the symmetrical positions are made to be mutually different in depth or height thereof as the second embodiment shown in FIG. 2, two minimum values are generated in the medium frequency region as stated above, hence still lower dynamic spring constants can be attained.

FIG. 5 is a view seeing from the arrow Z direction of FIG. 4, namely a parallel direction to an input direction X of the principal vibration. In this state, the medium to high frequency device 17 is made in a generally oval shape and a pair of cut out portions 21 are formed at symmetrical positions.

This cut out portion 21 corresponds to the shape cut out from a portion facing the thin wall portion 7 by ΔR part among the main body 20 constructed originally as a circle having a radius R in an arrow Z direction. On an arcuate portion 22 having a radius R in the 90 degree different direction therewith, a flange 23 is formed.

Owing to this cut out portion 21, a projection area of the medium to high frequency device 17 in an axial line direction of the first support member 1 becomes smaller than that in a case whole body is constructed as a circle having a radius R and the flow volume of the liquid owing to the medium to high frequency device 17 is as much reduced.

As a result of this, as apparent from FIG. 4, a space as a gap d1 is formed between the cut out portion 21 and the thin wall portion 7 and a space as a gap d2 is also formed between the arcuate portion 22 and the rubber inner wall 24 facing therewith. In these gaps, d1 is arranged to be by far larger than d2. These spaces correspond to the orifice gap 18.

Figure 7:
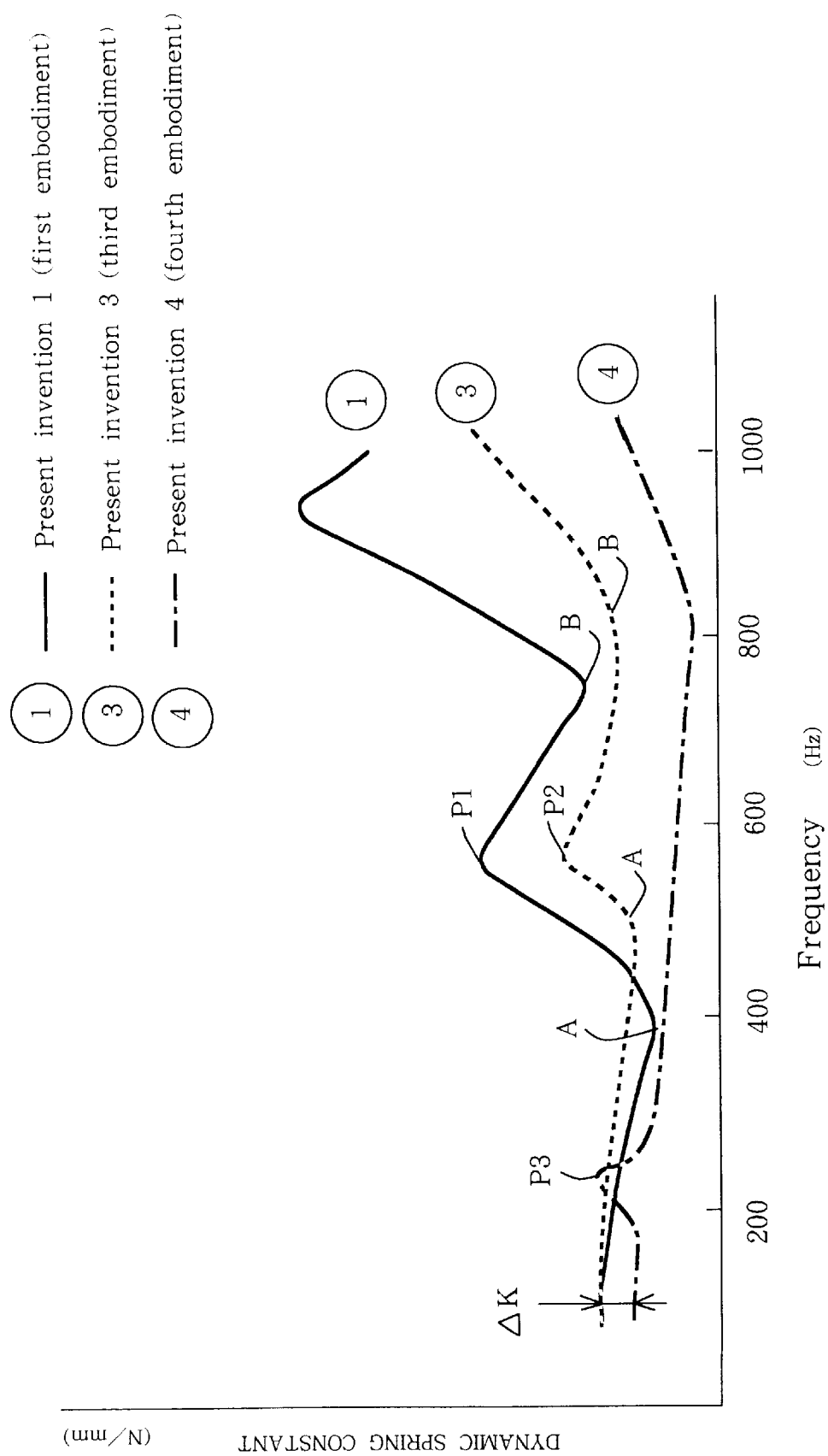
FIG. 7 is a graph showing the dynamic spring characteristic according to the third and fourth embodiments.

Next, an operation of the present embodiments will be described. In FIG. 7, ① is a characteristic curve relating to the first embodiment of the first invention and ③ is a characteristic curve of the third invention (namely the present third embodiment). As shown therein, when the vibration of the medium frequency range is inputted, the thin wall portion generates the membrane resonance and a minimum value A is yielded at the beforehand set specified frequency.

Furthermore, when a vibration of the high frequency range is inputted, a minimum value B is yielded at a specified frequency by the liquid column resonance in the orifice gap 18 between the thin wall portion 7 and the inner face of the conical portion 4.

As a result of this, two minimum values A and B are yielded in the medium to high frequency range, against the conventional example lacking such a consideration, the extremely low dynamic spring characteristic is realized.

Furthermore, because the minimum value B generated by the liquid column resonance is smaller than the case in which the gap d1 is large and said projection shape of the medium to high frequency device 17 is circular, the resonance frequency becomes higher than the case in which the circular medium to high frequency device is used as shown by a characteristic curve of a phantom line as a comparative example. At the same time, because liquid volume made to be flowed by the medium to high frequency device 17 is lessened, a liquid resonance energy becomes small and approaches the resonance energy of the membrane resonance.

As a result of this, an interval of the minimum values A and B become wider and the peak value P is reduced in a large scale than the peak value P1 in the case of using the circular medium to high frequency device, hence as a whole, the low dynamic spring constant is obtained.

Figure 6:
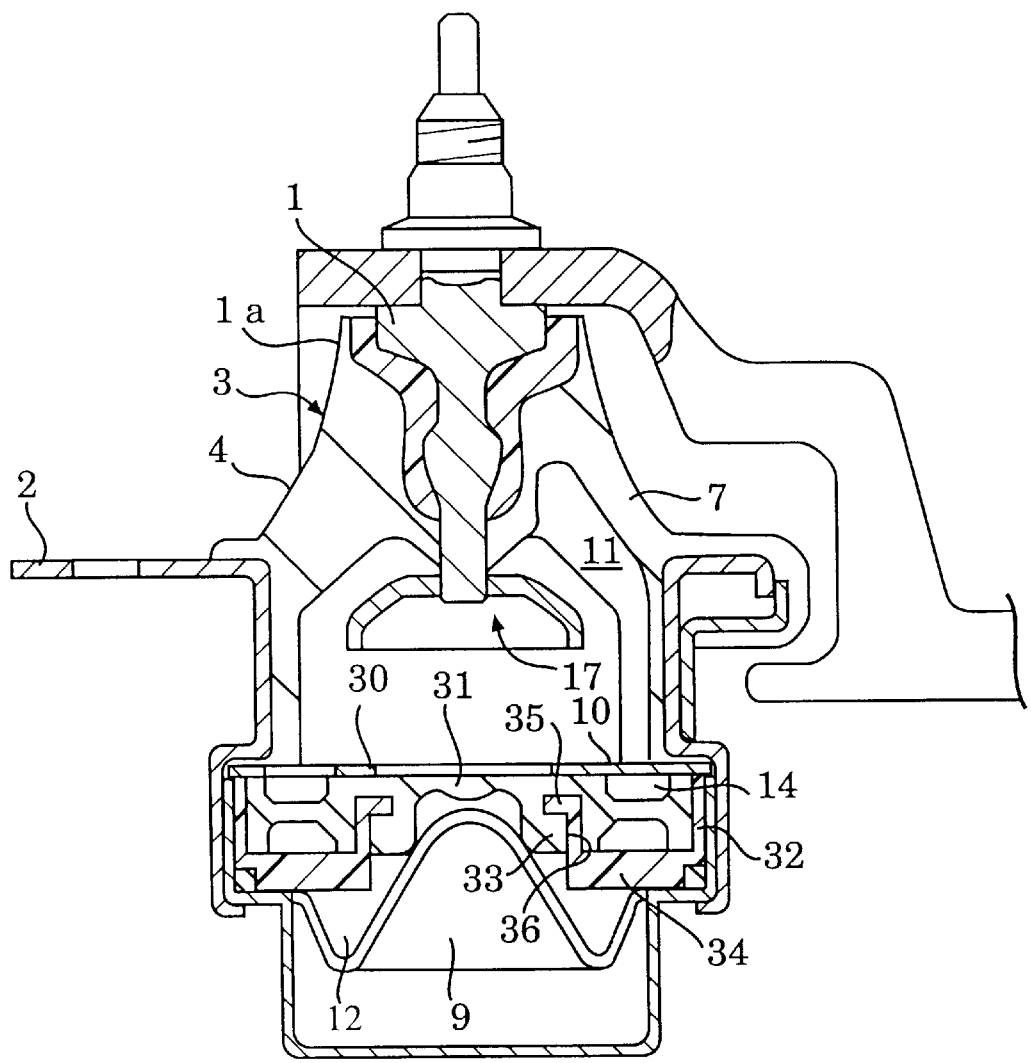
FIG. 6 is a view equivalent to FIG. 1 according to the fourth embodiment.

In FIG. 6, the fourth embodiment is shown, namely, the resilient partition wall is provided on a lower portion of the engine mount in the first embodiment. A resilient partition wall 31 made of the elastic membrane such as rubber and the like is faced to a hole 30 formed in the center portion of the ring shaped partition member 10. A bottom peripheral portion of a resilient partition wall 31 is made to be integrated thick portion 32 and on a bottom portion thereof, a leg portion 33 is formed together to deform according to the deforming of the resilient partition wall 31.

A part of the resilient wall 31 facing the hole 30 is arranged to be a thin wall portion against the thick wall portion 32 and functions as a kind of a rubber spring owing to possessing spring property. Which is resiliently deformed according to the inner pressure change of the main liquid chamber 11 and is adapted to membrane resonate.

The leg portion 33 is abutted to a wall portion 35 integrally formed with a lower support member 34 and renders a non-linear spring characteristic for the deformation of the resilient partition wall 31. The lower support member 34 is a resin made member supporting a bottom portion of an outer peripheral side of the thick wall portion 32 and the wall portion 35 is formed to crook upward generally in perpendicular from the inner peripheral side thereof. The wall portion 35 is fitted into a ring groove 36 formed on a bottom portion of the thick wall portion 32 and a side abutting to the wall portion 35 of the leg portion 33 is separated from other thick wall portion 32 by the ring groove 36 so as to freely move.

Numeral 9 in the drawing shows a diaphragm and the orifice passage 14 is formed within thickness of the thick wall portion 32 in a circumferential direction and communicates the main liquid chamber 11 and the auxiliary liquid chamber 12. Numeral 1a is a resin made bracket integrated to a periphery of the first support member as a forged product.

According to the present embodiment, as shown in characteristic curve ④ of FIG. 7, since the resilient partition wall 31 absorbs the inner pressure of the main liquid chamber 11 by the resilient deforming for itself, the dynamic spring constant in the medium frequency range is reduced by ΔK comparing to the characteristic curve ①, ③. Further, the resilient partition wall 31 membrane-resonate by liquid flow in the main liquid chamber 11.

Because the membrane resonance by the resilient partition wall 31 is complicated with the membrane resonance by the thin wall portion 7 in the conical portion 4 and the liquid column resonance owing to the medium to high frequency device 17, the minimum values A, B and the peak of the dynamic spring constant between A, B as shown in the characteristic curve ① to ③ are gently smoothed and remarkably low dynamic spring characteristics are attained over the approximately entire frequency range of the medium to high frequency.

The peak P3 of the dynamic spring in the FIG. 3, because the resilient partition wall 31 of the present embodiment membrane-resonate naturally at a plural frequency, occurs by one resonance thereof and a part left without being smoothed through the liquid column resonance by the medium to high frequency device 17. Therefore, the characteristic is made to be a little higher dynamic spring constant in the medium frequency range than that of the characteristic curve ① and the like, but such degree of the high dynamic spring constant can be satisfactorily allowed in the actualization of the low dynamic spring constant over whole frequency range.

Figure 8:
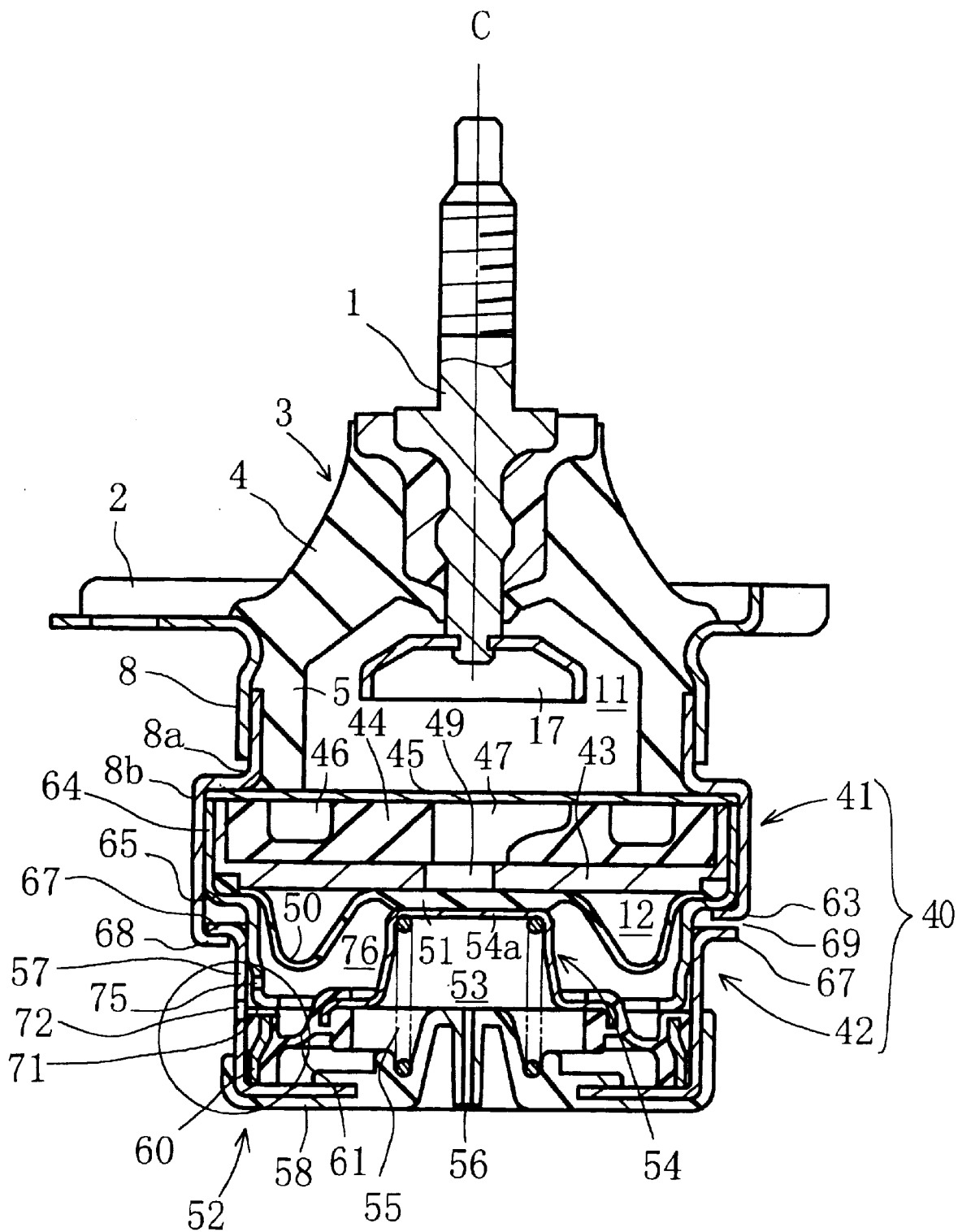
FIG. 8 is a general sectional view equivalent to a view taken along line 8—8 of FIG. 10 according to the fifth embodiment.
Figure 9:
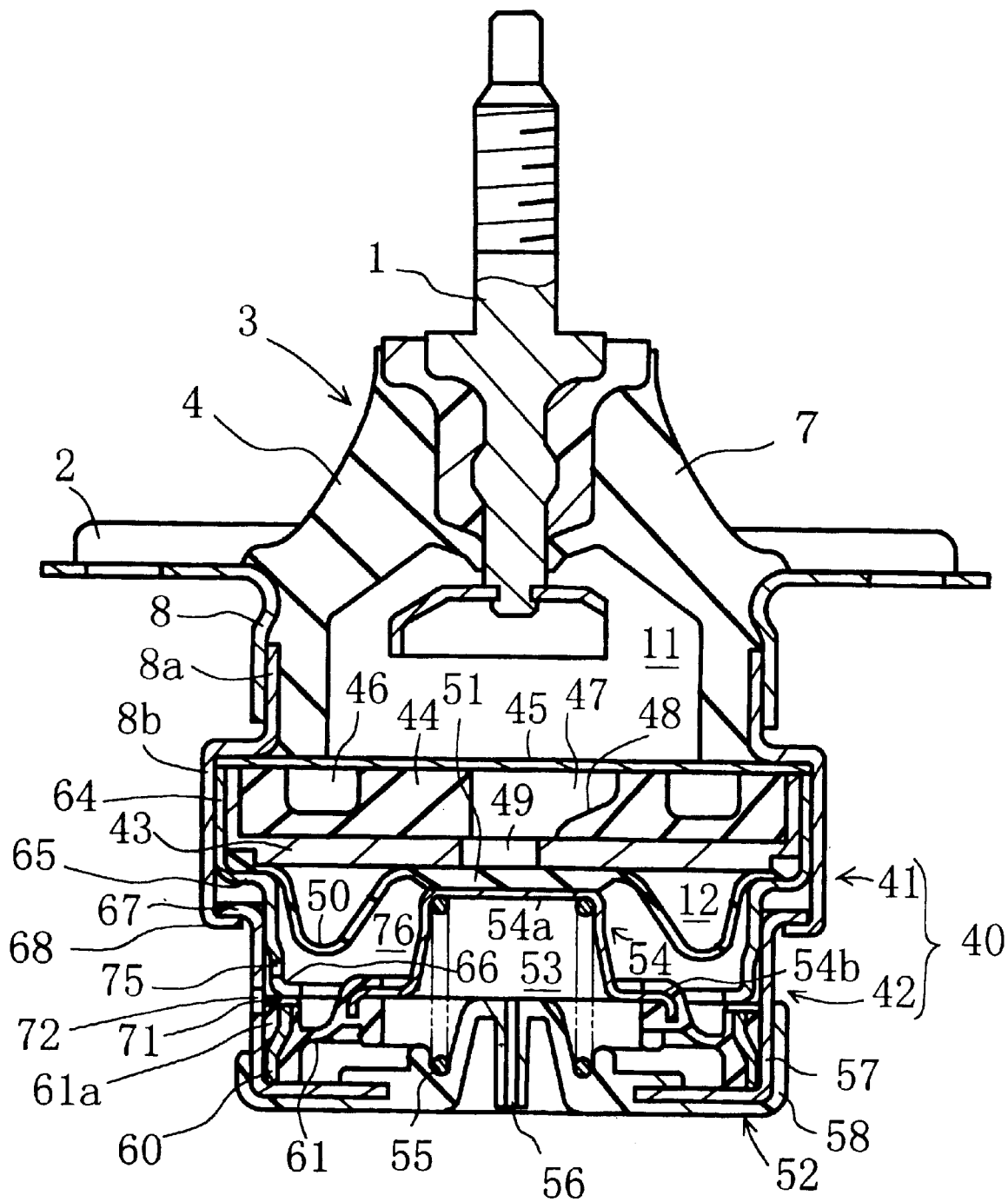
FIG. 9 is a general sectional view equivalent to a view taken along line 8-9 of FIG. 10 according to the fifth embodiment.
Figure 10:
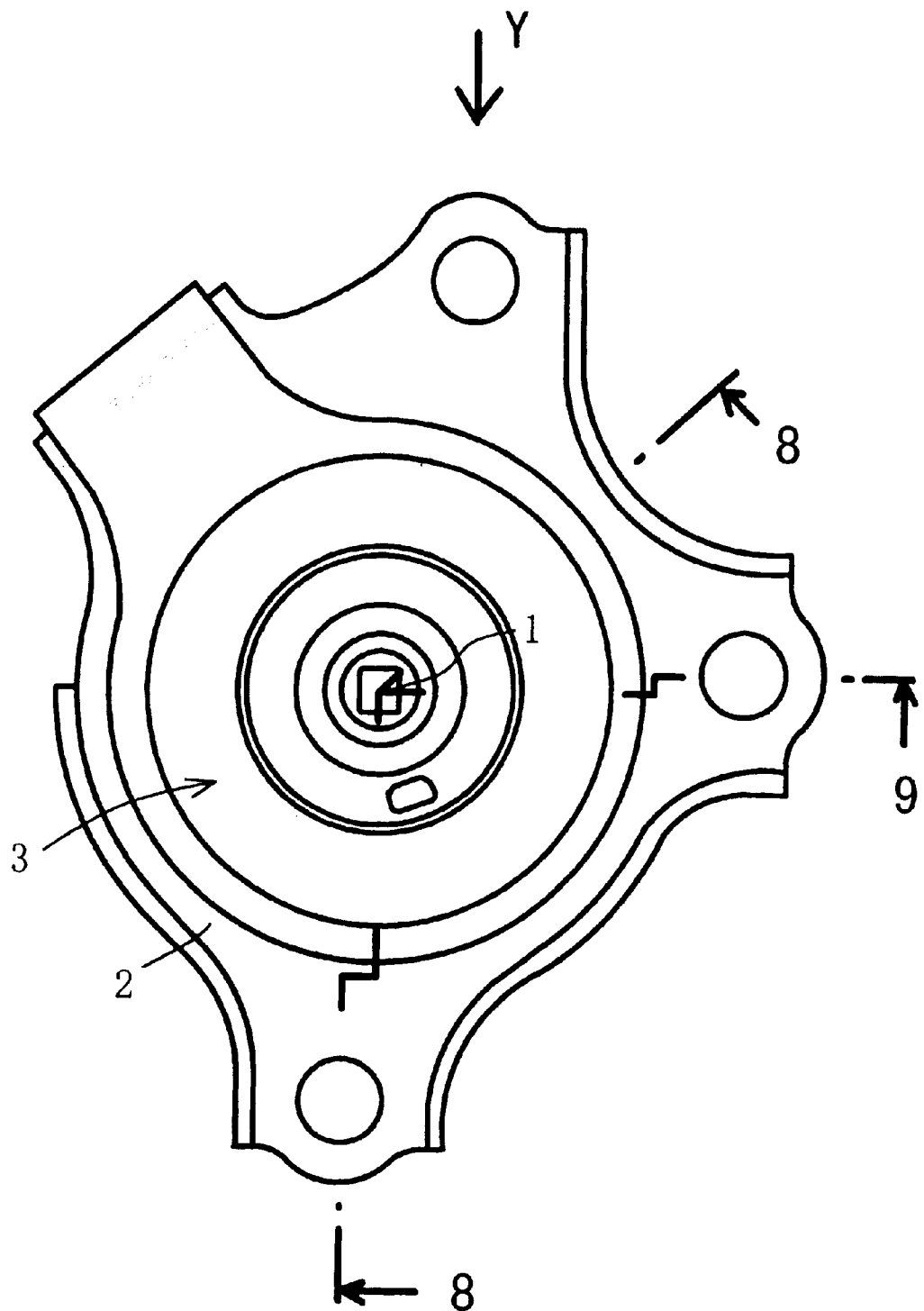
FIG. 10 is a plan view of an engine mount.
Figure 11:
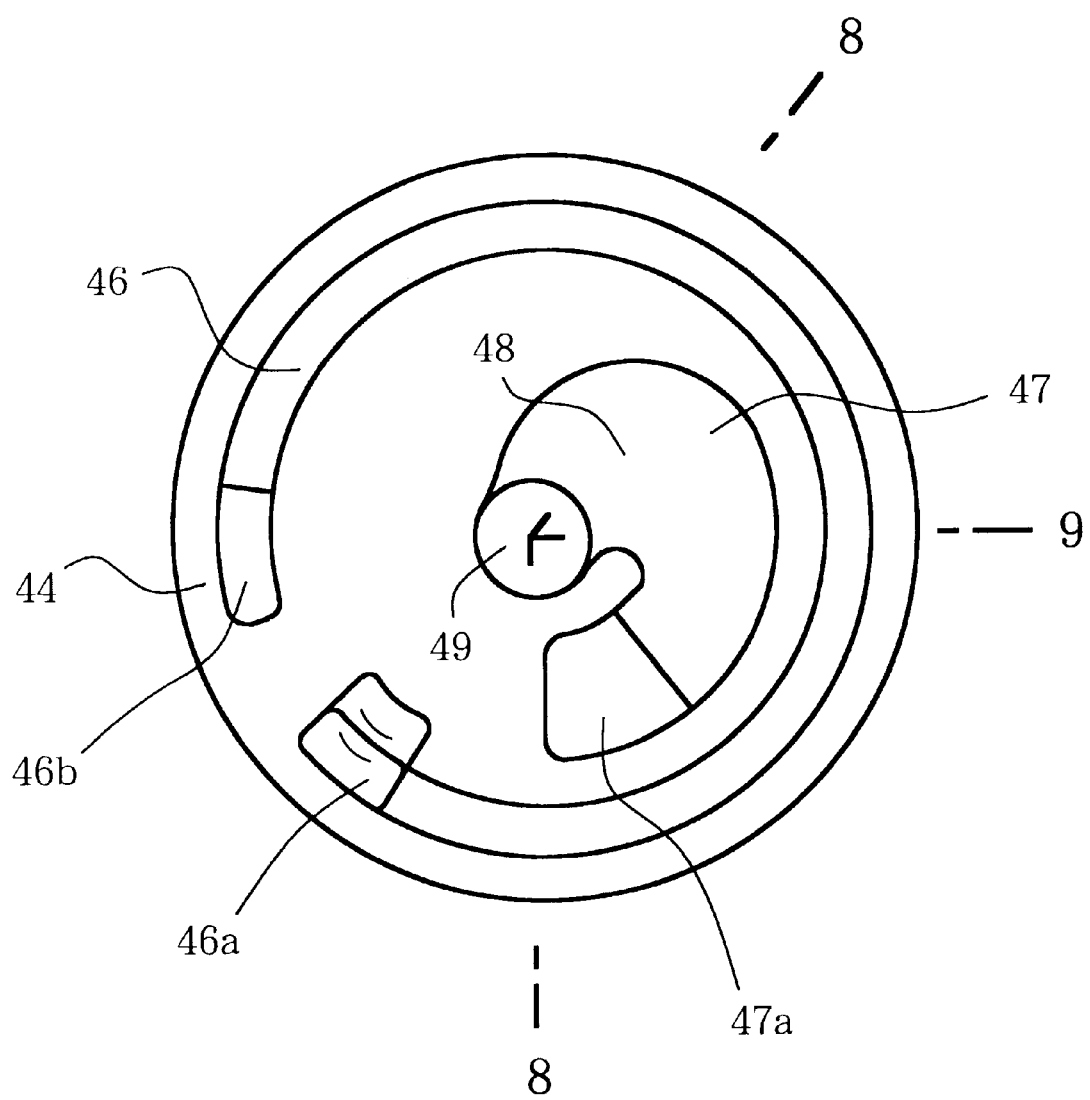
FIG. 11 is a view showing a plan viewed shape of a first and second orifice passages.
Figure 12:
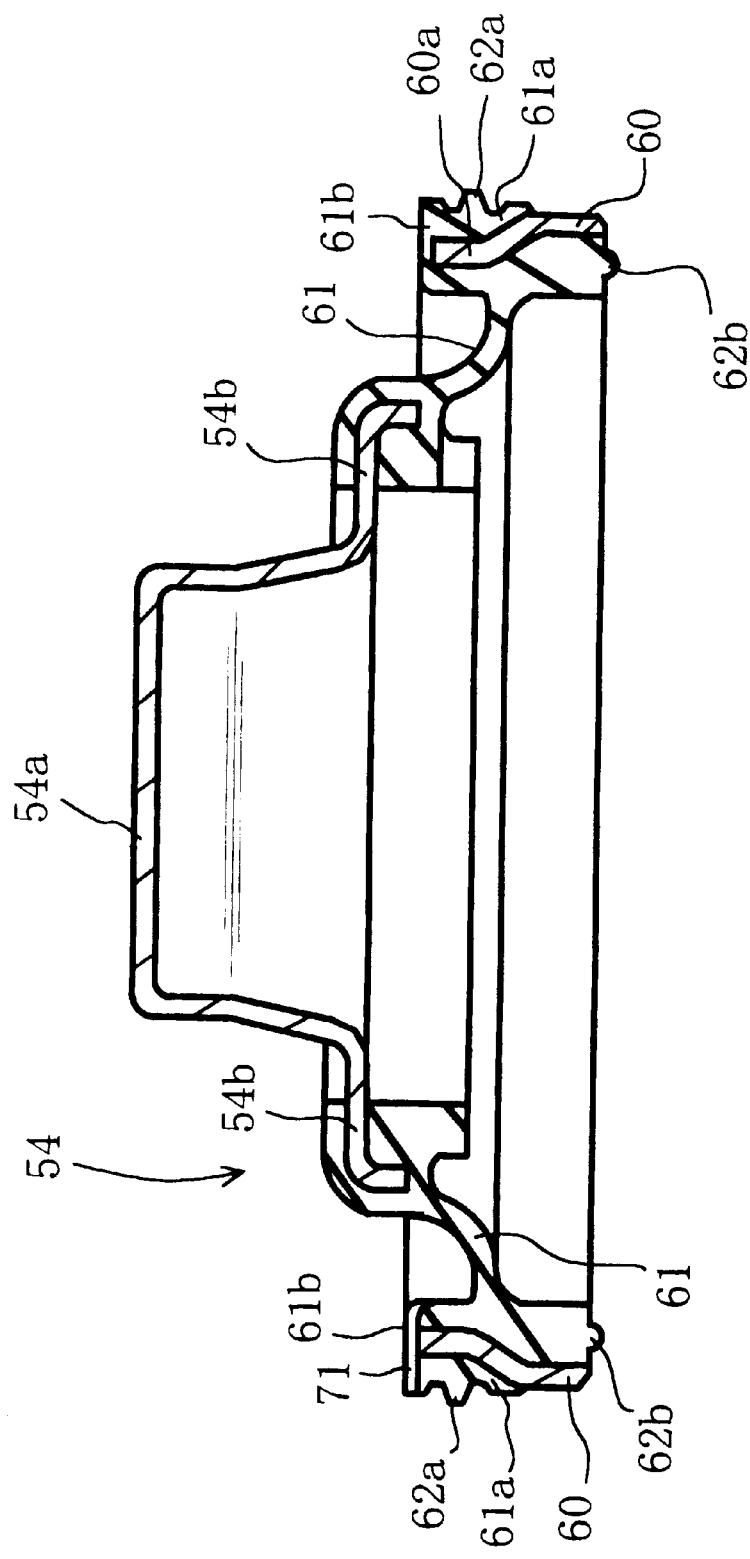
FIG. 12 is a sectional view of a driving portion.
Figure 13:
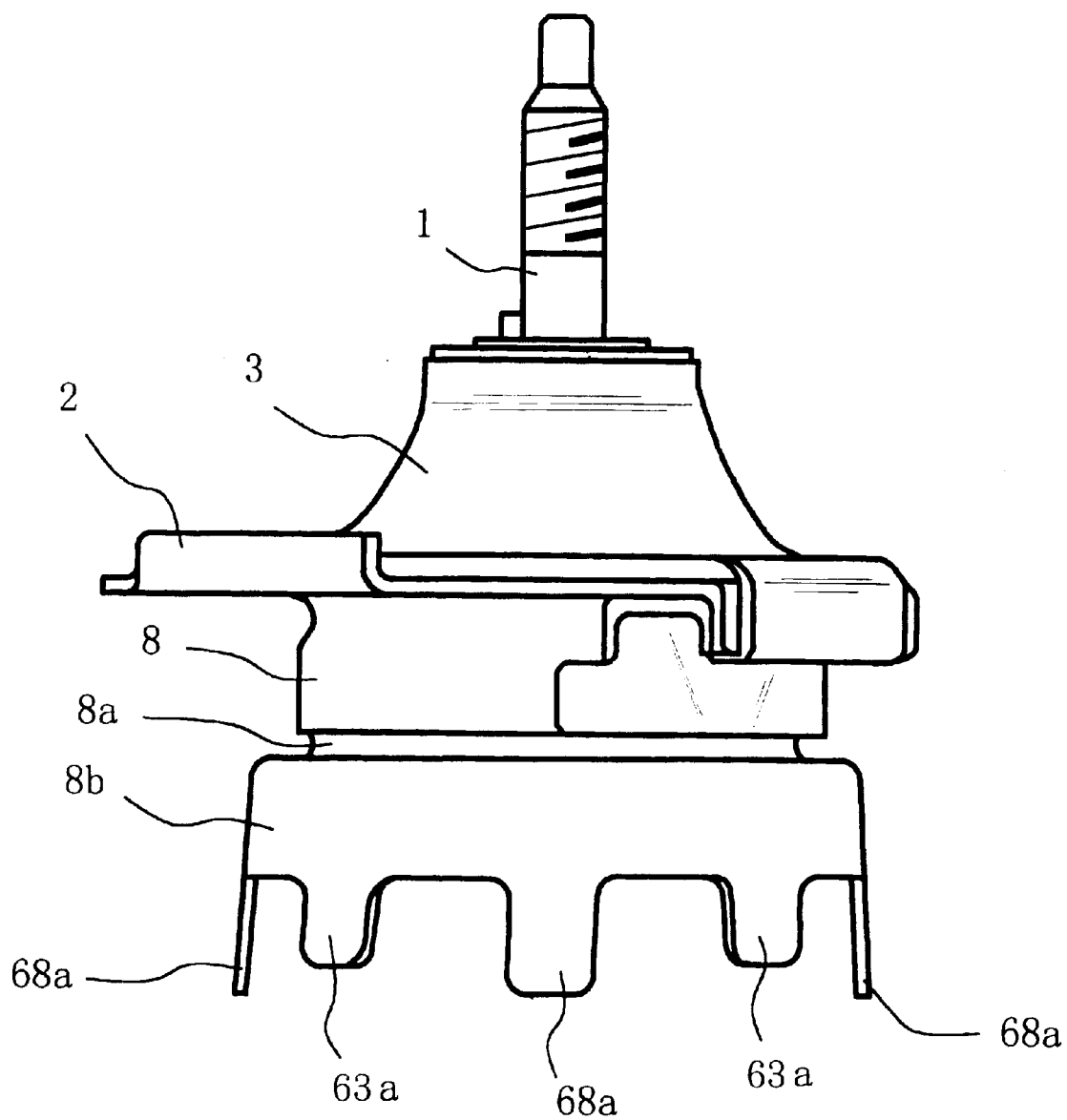
FIG. 13 is a view showing such as a side shape of a cylindrical covering portion.
Figure 14:
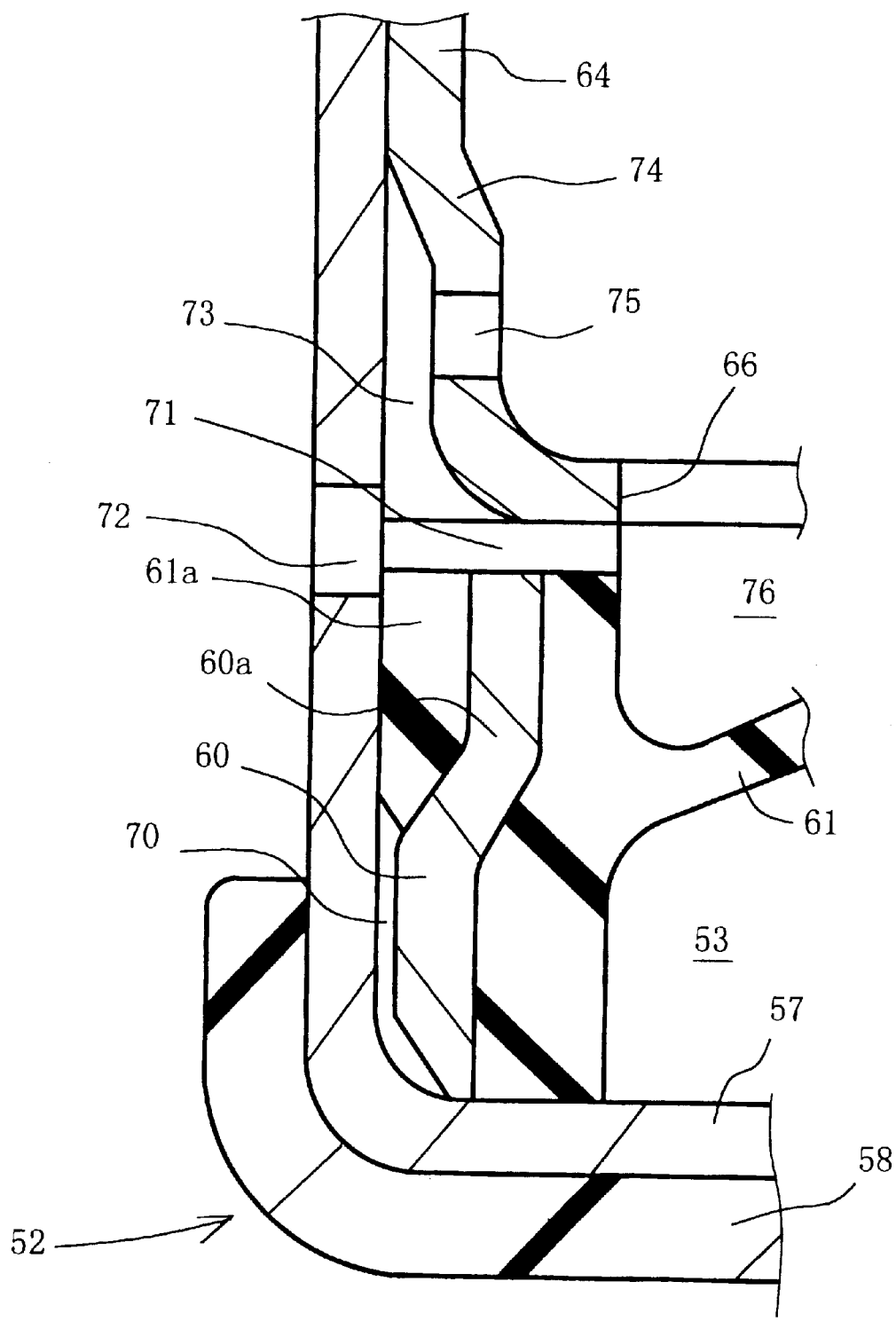
FIG. 14 is an enlarged sectional view of a principal portion.
Figure 15:
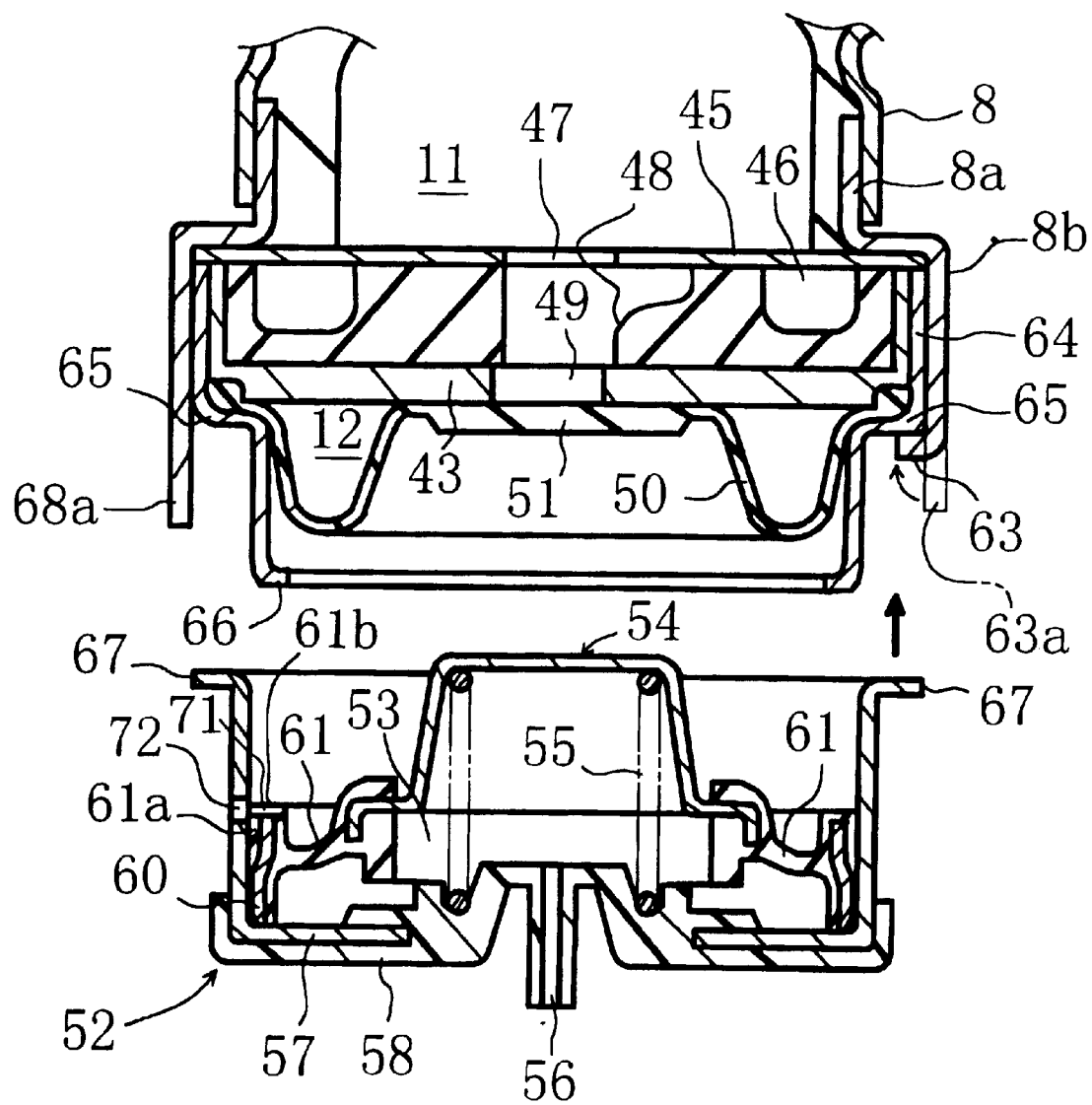
FIG. 15 is a view showing an assembling process of the device.

In FIGS. 8 to 16 showing the fifth embodiment, FIG. 8 is a general sectional view equivalent to a view taken along line 8—8 of FIG. 10, FIG. 9 is a general view equivalent to a view taken along line 8-9 of FIG. 10, FIG. 10 is a plan view of an engine mount, FIG. 11 is a view showing a plan viewed shape of a first and second orifice passages, FIG. 12 is a sectional view of a switching valve, FIG. 13 is a view showing such as a side shape of a cylindrical covering portion, FIG. 14 is an enlarged sectional view of a principal portion, FIG. 15 is a view showing an assembling process of the device and FIG. 16 is a characteristic curve of the present embodiment showing together with other comparative example. The present embodiment is equivalent to one adopting an elastic control mechanism using a switching valve instead of the resilient partition wall in the former embodiment.

This elastic control mechanism 40 is assembled from a orifice portion 41 and a driving portion 42, the orifice portion 41 comprises a cylindrical upper cup-like member 43, a circular and thick orifice member 44 fitted inside thereof, a disk-like cover 45 being covered thereon and a diaphragm 50 forming the auxiliary chamber 12 between the orifice member and therewith.

For a orifice member 44, a first orifice passage 46 corresponding to the damping orifice similar to the orifice passage 14 of the each former embodiment to contribute for the vibration damping in the low frequency range and the second orifice passage 47 arranged to be the orifice passage for the specified frequency are provided.

As is apparent from FIG. 11 showing a plan viewed shape of the first orifice passage 46 and the second orifice passages 47, first orifice passage 46 communicates with the main liquid chamber 11 and the auxiliary liquid chamber 12 at the not shown opening extending spirally in the thickness of the orifice member 44 along the neighbor of the outer periphery thereof. Hereupon, numeral 46a is an inlet of the first orifice passage 46 made to be a slope enlarged toward a flow in side, 46b is an outlet thereof and 47a is an inlet of the second orifice passage 47. A sectional line is also expressed to show the section of FIG. 8 and FIG. 9 corresponding to FIG. 10.

The second orifice passage 47 is formed passing through both sides of the orifice member 44 inside of the first orifice passage 46 and a guide slope 48 is formed toward an outlet 49 formed in the about center portion of the upper cup-like member 43 to make the slant flow line for the liquid flowing out from the outlet 49.

The shape of the opening portion of the outlet 49 is made also to be asymmetric to the center line C and is opened widely toward the flow line direction by the guide slope 48. This outlet 49 is adapted to be freely opened and closed by an open and close portion 51 formed integrally at a center portion of a diaphragm 50.

The diaphragm 50 is similar to one of the former each embodiment but different in a point that it is provided integrally with the open and close portion 51 arranged to be a flat contact surface at the center portion thereof to seat tightly on a periphery of the outlet 49. Opening of the open and close portion 51 can be assured through the liquid flowing out from the outlet 49 pushing an offset position from a center by the slant flow line.

The driving portion 42 comprises a lower cup-like member 52 and a switching valve 54 fitted inside thereof to form a sealed space 53, a seat portion 54a to be a top portion of the switching valve 54 abuts to the open and close portion 51. The switching valve 54 is urged to a closed direction by a return spring 55 and make the switching valve 54 to move against the return spring 55 by connecting the inside of the sealed space 53 to a not shown negative pressure supply through a joint pipe 56 for making the open and close portion 51 free to open an outlet 49 of the second orifice passage 47.

Open and close of the switching valve 54 is possible to be set for an optional specified frequency, but in the present embodiment, it is set for a frequency while engine idling so the second orifice passage 47 is adapted to be an idling orifice. Incidentally, open and close of the switching valve 54 is possible not only by utilizing such a negative pressure but also by various known methods such as electromagnetic type.

The lower cup-like member 52 comprises a cup-like metal 57 on a center bottom portion thereof formed a large opening and a resin portion 58 formed integrally with the joint pipe 56 to cover the bottom portion from a side lower half portion thereof, and a fixing ring 60 is fitted by a pressure fitting to an inside of a peripheral portion of the cup-like metal 57 to fix the switching valve 54.

FIG. 12 is an enlarged view of a section of the switching valve 54 in FIG. 8. In this drawing, the switching valve 54 is made to be about up side down cup-like and a membrane member 61 made from elastic member such as rubber connects between the flange portion 54b formed on a lower portion thereof and the fixing ring 60. The membrane member 61 does not possess a spring elasticity affecting to an operation of the switching valve 54.

A part of a membrane member 61 integrated to cover the fixing ring 60 is made to be an upper end covering portion 61b covering an upper end portion of a small diameter portion 60a formed on an upper portion of the fixing ring 60 and come to the outer side therefrom to be an outer periphery covering portion 61a. The outer periphery covering portion 61a and the upper end covering portion 61b are formed on the whole circumference and these parts compose the ring portion elastic member of the present invention. On the outer surface of the outer periphery covering portion 61a, a first seal lip 62a is integrally formed to project to the radial direction. Also, a second seal lip 62b is formed to project downward from a lower end portion of the membrane member 61 inside the lower end portion of the fixing ring 60 a second seal lip 62b is formed to project downward. These seal lips are respectively formed on the whole circumference.

As is apparent from FIGS. 8, 9, 13 and 15, a downward extension portion 8a which is adapted to be a part of the cylindrical portion 8 and extends downward longer than the elastic member 3, possesses a large diameter portion 8b accommodating the orifice portion 41 thereon, and fixes the orifice portion 41 by a first caulking portion 63 formed on a lower end portion of the large diameter portion 8b.

Between the large diameter portion 8b and a peripheral wall portion of the upper cup-like member 43, an upper end portion of a positioning ring 64 is put in. The positioning ring 64 is adapted to be a step portion 65 at a lower portion of the upper cup-like member 43 and a lower portion than the step portion 65 is made to be a small diameter portion having an outer diameter with the same extent as the inner periphery of the cup-like metal 57.

Because an outer peripheral portion of the diaphragm 50 and an outer periphery of a bottom portion of the upper cup-like member 43 are supported in an inside of the step portion 65 and are caulked from the outside thereof by the first caulking portion 63 which resulted in that the step portion 65 make the outer periphery of the diaphragm 50 to stick to the bottom portion of the upper cup-like portion 43, liquid tightness of the auxiliary liquid chamber 12 and the main liquid chamber 11 are assured.

A lower end portion of the positioning ring 64 is adapted to be a flange portion 66 bending inward and is positioned by abutting elastically to an upper end covering portion 61b which is a part of the membrane member 61 and covers an upper end portion of the fixing ring 60.

On the other hand, an upper end portion of the cup-like metal 57 extends also to a vicinity of the step portion 65 where it is adapted to be a flange portion 67 bending outward and is fixed by a second caulking portion 68 provided to the large diameter portion 8b. Between a flange portion of the cup-like metal 57 and the first caulking portion 63, a small gap is formed (see FIG. 8).

FIG. 13 is a view showing a side shape of the cylindrical covering portion 8 before connecting with the driving portion 42 from an arrow Y direction of FIG. 10. In this drawing, the cylindrical covering portion 8 is shown in a state integrating the upper construction such as the elastic member 3 and on a lower portion of the large diameter portion 8b, a first claw 63a and a second claw 68a are provided projecting downward.

The first and second claws 63a and 68a are parts to form the first and second caulking portions 63 and 68 by bending the lower end portions thereof, either parts are made to have different height by changing the downward projecting amount on the lower end portion of the large diameter portion 8b and formed alternately at suitable intervals to a circumferential direction.

FIG. 14 is an enlarged view of F portion in FIG. 8. As apparent from the drawing, an outer diameter of a lower portion of the fixing ring 60 is smaller than an inner diameter of the cup-like metal 57 and between both members some amount gap 70 is arranged. On the upper end covering portion 61b covering the upper end of the fixing ring 60, a radial direction ventilation groove 71 is formed at suitable intervals to a circumferential direction and communicates the inner space 76 between the switching valve 54 and the diaphragm 50 with the atmosphere through an atmosphere opening hole 72 formed to pass through the cup-like metal 57 in the vicinity thereof. Near part of the flange portion 66 of the positioning ring 64 overlapping on the upper end covering portion 61b, the diameter is further reduced and arranged to be a step portion 74 forming a small gap 73 between the inner periphery of the cup-like metal and therewith, where a through hole 75 is provided. The inner space 76 communicates with the atmosphere opening hole 72 between the switching valve 54 and the diaphragm 50 through said through hole 75. A lower portion of the atmosphere opening hole 72 is provided on a lower position than the ventilation groove 71.

FIG. 15 shows an assembling process of the elastic control mechanism 40, first the orifice portion 41 is accommodated in the large diameter portion 8b and is caulked by the first caulking portion 63, by which the liquid sealed mount portion is integrated to be a sub-assembly.

Next, after the driving portion 42 is superposed under the orifice portion 41 and the flange portion 66 is abutted against an upper end of the fixing ring 60, the second caulking portion 68 is caulked to the flange portion 67, which makes the whole assembly.

At this time, since the positioning ring 64 can decide a mounting position of the driving portion 42 to the orifice portion 41, the positioning ring 64 is elastically pressed against the fixing ring 60 side through the upper end covering portion 61b. Even if there is some amount of dimensional error, a gap 69 between the first caulking portion 63 and the flange portion 67 of the cup-like metal 57 allows it to be easily absorbed.

Although the medium to high frequency device 17 of FIG. 7 is used in the present embodiment, it can be optionally changed to the one of the other embodiments. Although the specific structural details of each embodiment of the present invention may vary between embodiments, each of the embodiments of the present invention incorporates the use of a medium to high frequency device 17 and at least one thin walled portion 7 formed by a respective recess 6.

According to the present embodiment, since the membrane resonance of the thin wall portion 7 in the medium frequency range and the liquid column resonance in the gh frequency region are expected, the characteristic curve in the medium to high frequency range becomes ⑤ of FIG. 16 and is approximately similar to the characteristic of the third embodiment (③ of FIG. 7) in this region.

However, because in an idling range as the low frequency range in the present embodiment, the switching valve 54 is lowered and the second orifice passage 47 is communicated with the auxiliary liquid chamber 12 through detaching the open and close portion 51 from the outlet 49, as is shown in the drawing, the dynamic spring constant in the idling range is abruptly reduced and can be lower than that of ④ in FIG. 7.

Therefore, the low dynamic spring constant can be realized in the almost entire range over the low frequency, the medium frequency and the high frequency, additionally, because the further low dynamic spring constant can be achieved in the designated frequency by the elastic control mechanism. For example, in the idling range it is easily possible to gain the low dynamic spring constant in the frequency especially required. But, this designated frequency can be optionally set in the almost entire frequency range from the low frequency range to the high frequency range.

In FIG. 16, ⑥ and ⑦ are the dynamic spring characteristics of the comparative examples relating to the liquid sealed mount, the elastic mount of each liquid sealed mount thereof is a type not provided with the thin wall portion by the recess such as present invention having the medium to high frequency device, ⑥ is an example using the elastic partition member as shown in the embodiment of FIG. 6 and ⑦ is an example using the elastic control mechanism same as the present embodiment. Either examples are provided with the damping orifice for the low frequency range, but are not constructed to produce the membrane resonance in the medium frequency region and the liquid column resonance in the high frequency range as the present invention, and are almost the same as the conventional example in FIG. 3. Incidentally, because in ⑦, switching of the orifice passage in the idling region is practiced in the idling region by the same mechanism, either characteristics coincidences merely in this portion.

Additionally, in the embodiment, since the orifice portion 41 in which the liquid is sealed and the driving portion 42 actuating the valve by the negative pressure are separated and are made to be individually secured in different processes, it can be surely prevented that the sealed liquid invades into the driving portion 42 side and reaches to the driving center portion such as the negative pressure tank. Consequently, the quality of the products can be improved, at the same time, the assembling process becomes easier.

In addition, if the driving portion 42 is removed and the orifice portion 41 is changed to the partition wall composed of such as the partition member 10 or to the elastic partition wall construction of FIG. 6, the mount construction of FIG. 1 or FIG. 6 is easily obtained, hence the components sharing can be achieved.

Moreover, because the orifice portion 41 and the driving portion 42 can be fixed by the first caulking portion 63 and the second caulking portion 68 owing to two kind of the first and the second claws 63a and 68a provided on the large diameter portion 8b, the number of the parts can be decreased, the fixing construction and the assembling process can be simplified.

At this time, since the gap 69 is formed between the flange portion 67 of the cup-like metal 57 and the first caulking 63 and the flange 66 on the lower end portion of the positioning ring 64 is abutted against the upper end covering portion 61b, the dimensional tolerance in the height direction (namely the center line C direction) can be absorbed. Still more, the positioning ring 64 can decide the mounting position of the driving portion 42 to the orifice portion 41. Therefore, the dimensional control can be more roughly practiced than the former one, the assembling process becomes easy and a reduction of costs can be carried out.

Furthermore, because some amount of the gap 70 is provided between the lower portion of the fixing ring 60 fixing the switching valve 54 and the inside face of the cup-like metal 57 and the fixing ring 60 is arranged to fit into the inside of the cup-like metal 57 via the elasticity of the outer periphery covering portion 61a, when the fixing ring 60 is fitted into the cup-like metal 57, it can be done with the light load hence a capital investment in a press machine can be decreased. At the same time, since the outer periphery covering portion 61a on the upper portion of the fixing ring 60 is resiliently contacted to the inside of the cup-like metal 57, which result in absorbing the dimensional tolerance in the radial direction in cooperation with exist of said gap 70, the dimensional control can be more roughly practiced than the former one, the assembly process becomes easy and the reduction of costs can be carried out as well.

In addition, since the fixing ring 60 is pressed against the inside of the cup-like metal 57 by the first seal lip 62a and also pressed against the bottom portion of the cup-like metal 57 by the second seal lip 62b, which result in that the fixing ring 60 possesses a double seal construction to the cup-like metal 57, that makes the air-tightness higher in the sealed space 53 applied with the negative pressure and the operational accuracy of the device can be improved.

Furthermore, because the ventilation groove 71 and the through hole 75 communicate with the atmosphere opening hole 72 through the gap 73 formed on the whole circumference, the air in the inner space 76 between the switching valve 54 and the diaphragm 50 can be released to the atmosphere. Consequently, it can displayed the most of an orifice resonance effect through making the movement of the diaphragm 50 smooth. Also, since the atmospheric pressure can be maintained from the above discussed reason even if the thermal expansion or contraction of the air is generated, the performance of the device can be stabilized through reducing the effect to the characteristics by thermal change. Besides, since the lower portion of the atmosphere opening hole 72 is provided on the lower position than the ventilation groove 71, the water entering from the atmosphere opening hole 72 is hard to gather in the ventilation groove 71 and the through hole 75.

Moreover, the ventilation groove 71 and the through hole 75 can communicate with the atmosphere opening hole 72 via the gap 73 even if fixing ring 60 and the positioning ring 64 are respectively situated on any place to the cup-like metal 57 in the circumferential direction. Accordingly, since the fixing ring 60 and the positioning ring 64 can be respectively positioned freely to the cup-like metal 57 in the circumferential direction, assembling performance can be improved.

The present invention is available in various way not limiting to the above stated embodiment, for example, the medium to high frequency device of the second embodiment can be combine to the third embodiment. Similarly, the medium to high frequency device of the first embodiment can be combined to the fifth embodiment.

What is claimed is:

1. A liquid sealed type rubber mount device comprising:
   a first support member attached to a vibration source;
   a second support member attached to a vehicle body;
   an elastic member in substantially conical shape interposed between the first and second support members, the first support member and second support member being adapted to form a liquid chamber therebetween with at least a part of a wall thereof; a partition wall dividing the chamber into a main liquid chamber and an auxiliary liquid chamber;
   an orifice passage formed within the partition wall for usually communicating the two liquid chambers; and
   a part of the wall composing said auxiliary liquid chamber is formed of a diaphragm; wherein a medium to high frequency device is provided which is attached to the first support member projecting into the main liquid chamber so as to absorb a vibration component in the medium to high frequency range by forming a flow space between the inner wall of the conical portion of the elastic member and therewith and at least one thin wall portion formed by a respective recess formed in the inner wall of the conical portion of the elastic member and in a vicinity of the medium to high frequency device so as to yield a minimum value for the dynamic spring characteristic by generating a membrane resonance via vibration input in the medium to high frequency range.

2. The liquid sealed type rubber mount device according to claim 1, wherein thin wall portions formed by respective recesses are provided at plural, symmetrical positions, and each thin wall portion is arranged with the same shape.

3. The liquid sealed type rubber mount device according to claim 1, wherein thin wall portions formed by respective recesses are provided at plural, symmetrical positions, and each thin wall portion is arranged with a different shape.

4. The liquid sealed type rubber mount device according to claim 1, wherein the medium to high frequency device is formed with a non-circular shape cut out portion adjacent to the thin wall portion among the peripheral portion thereof viewed from a principal input direction of the vibrations and a gap between the cut out portion and the thin wall portion is made to be larger than a second gap between a arcuate portion of said device and said inner wall.

5. The liquid sealed type rubber mount device according to claim 1, wherein said partition wall is arranged as an elastic partition wall changing the dynamic spring characteristic thereof according to an inner pressure change in the liquid chamber.

6. The liquid sealed type rubber mount device according to claim 1, wherein an elasticity control mechanism is provided to arrange a plurality of orifice passages having different properties in order to switch at a variety of designated frequencies.

7. The liquid sealed type rubber mount device according to claim 6, further comprises an open and close portion for switching the orifice passages between opened and closed positions, wherein the orifice passages are formed on a part of the diaphragm composing the auxiliary chamber, a driving portion to open and close the open and close portion, wherein a metallic cylindrical covering member is provided to cover a periphery of the elastic member, a first and a second claw are formed at different heights on an opening side of an end of the metallic cylindrical covering member and a first caulking portion fixing the partition wall and the diaphragm with the first claw and a second caulking portion fixing the driving portion with the second claw are provided.

8. The liquid sealed type rubber mount device according to claim 7, wherein the driving portion comprises a top portion abutting against the open and close portion, wherein an end of a cylindrical membrane member is integrated with an outer peripheral portion of the top portion to allow movement of the top portion, a fixing ring integrated with an other end of the cylindrical membrane member and a cup-like member being fitted with the fixing ring, wherein a positioning ring is provided on an end of the cylindrical covering member by the first caulking portion, and a tip portion of the positioning ring is abutted against a part of a ring portion elastic member covering the fixing ring after the tip portion of the positioning ring is inserted into the cup-like member and an opening edge portion of the cup-like member is fixed by the second caulking portion in a state that a gap is made between the opening edge portion of the cup-like member and the first caulking portion.

9. The liquid sealed type rubber mount device according to claim 8, wherein the fixing ring possesses a small diameter portion and a large diameter portion, a gap is made between an outer peripheral face of the large diameter portion and an inner peripheral face of the cup-like member, an outer periphery covering portion which is formed by the part of the ring portion elastic member and contacts the inner peripheral face of the cup-like member is provided on an outer peripheral portion of the small diameter portion, and wherein the outer periphery covering portion further comprises a first seal lip projecting from the outer periphery covering portion and pressing against the inner peripheral face of the cup-like member, and a second seal lip projecting from the ring portion elastic member close to an end portion of the fixing ring and pressing against a bottom portion of the cup-like member.

10. The liquid sealed type rubber mount device according to claim 9, wherein on a part of the positioning ring a small diameter portion is provided to form a circumferential gap between the inner peripheral face of the cup-like member and the small diameter portion of the positioning and through the circumferential gap an atmosphere opening hole is provided in the cup-like member for communicating with a space between the diaphragm and the driving portion.

* * * * *